S. RAMSBOTHAM.
VEHICLE WHEEL.
APPLICATION FILED MAR. 15, 1915.
1,188,320.
Patented June 20, 1916.
4 SHEETS—SHEET 1.
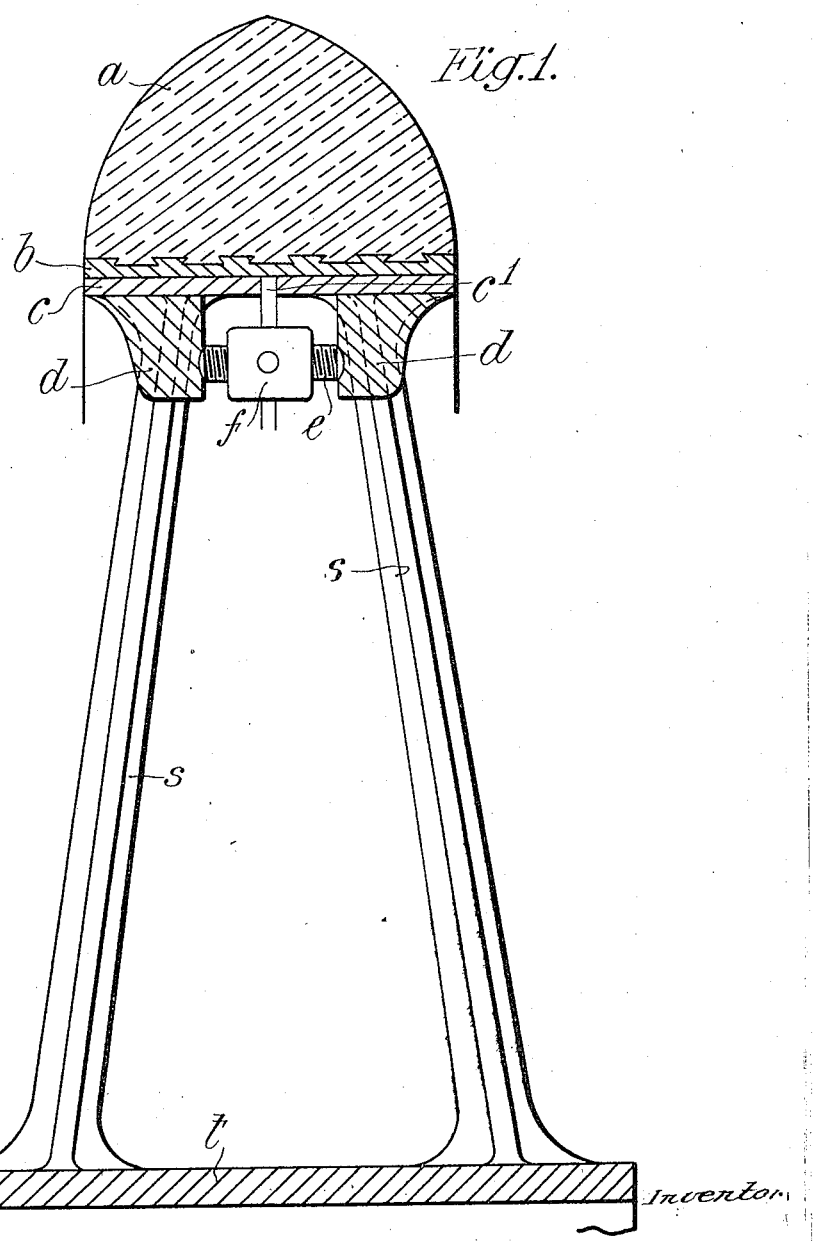

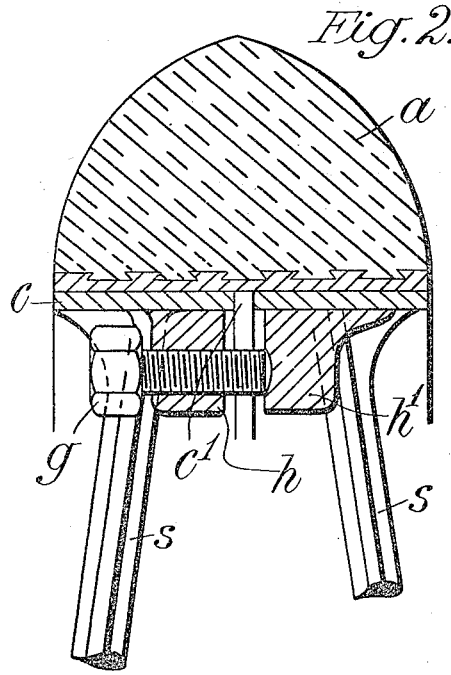
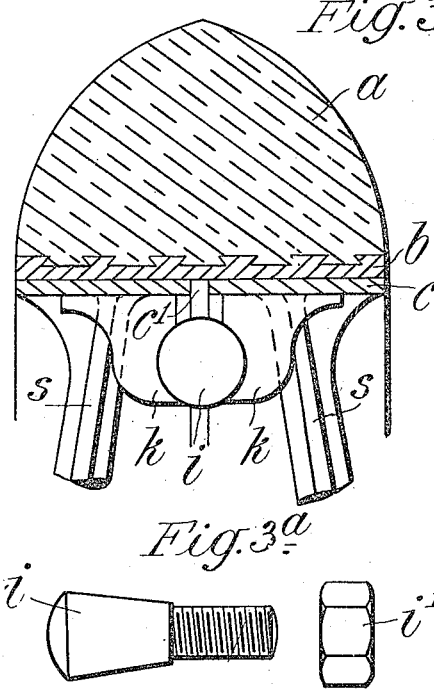
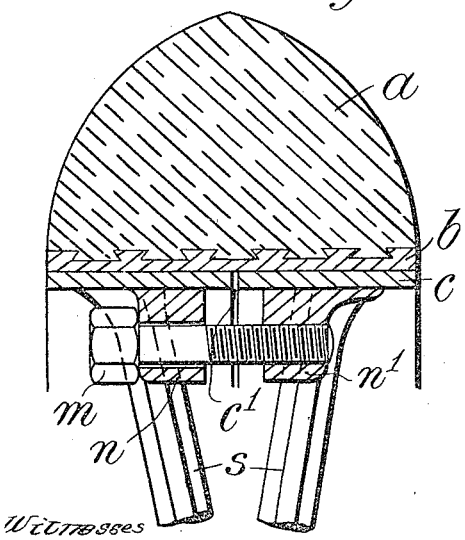
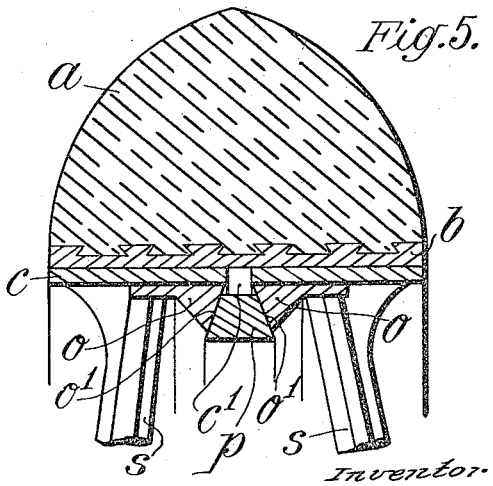

S. RAMSBOTHAM
VEHICLE WHEEL.
APPLICATION FILED MAR. 15, 1915.

1,188,320.

Patented June 20, 1916.
4 SHEETS—SHEET 4.

Witnesses

Inventor
S. Ramsbotham.
by　　　　　Atty.

UNITED STATES PATENT OFFICE.

STANLEY RAMSBOTHAM, OF STREATHAM HILL, LONDON, ENGLAND.

VEHICLE-WHEEL.

1,188,320.  Specification of Letters Patent.  Patented June 20, 1916.

Application filed March 15, 1915. Serial No. 14,417.

*To all whom it may concern:*

Be it known that I, STANLEY RAMSBOTHAM, a subject of His Majesty the King of England, residing at Streatham Hill, in the county of London, Kingdom of England, have invented certain new and useful Improvements in or Relating to Vehicle-Wheels, of which the following is a specification.

This invention has for its object the construction of metal wheels so as to enable solid elastic tires of the "band" type to be secured thereto in a detachable manner so that such tires may be fitted or removed without the necessity for a press.

The invention is concerned essentially with wheels of the cast or welded-up type, wherein the hub, the spokes, and the rim, are integrally connected together.

With the above object in view, the present invention consists in forming a metal wheel with a flat rim having a continuous circumferential division, that is to say, the rim comprises two rings side by side. Each rim part is connected to the hub by a set of spokes, the two sets of spokes being oppositely inclined to the vertical plane of the wheel.

The next, and essential feature of this invention consists in the provision of means at or in proximity to the rim parts for effecting transverse or axial adjustment thereof, with a consequent alteration of the inclination of the spokes. This variation in the inclination of the spokes is made use of to secure or release a "band" tire or tires fitted over the rim.

Figure 6:
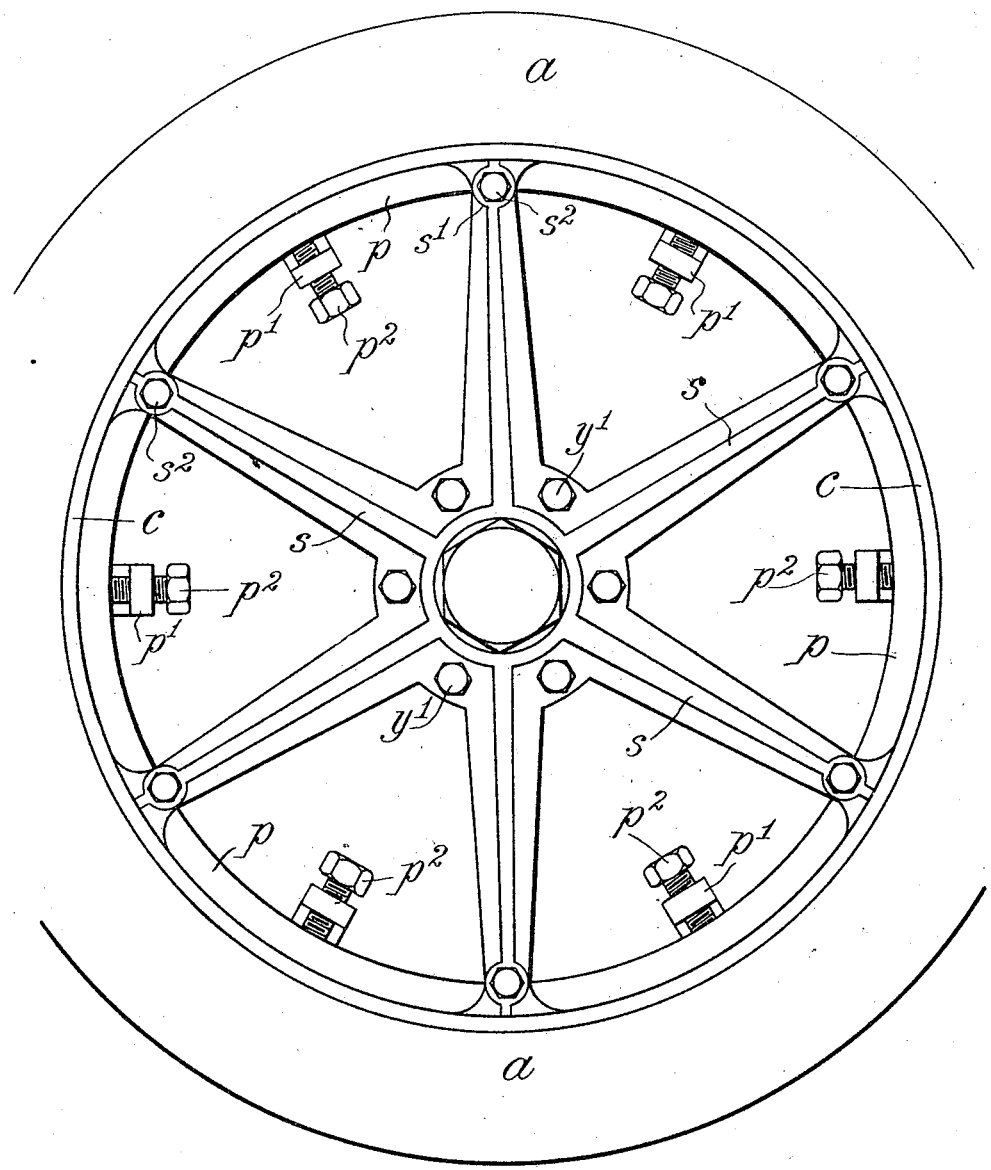

Referring to the accompanying drawings in which the principle of the invention is illustrated:—Figure 1 is a part vertical section of a metal wheel showing one form of the invention; Figs. 2, 3, 4, 5, 7, 8, 9, show various modified methods of carrying the invention into effect; Fig. $3^a$ is a detail of the device shown in Fig. 3; and Fig. 6 is a side elevation of a wheel embodying the arrangements shown in Figs. 7, 8, and 9.

Referring to Fig. 1 $s$ represents spokes, and $t$, a hub of ordinary construction, the spokes on one side of the wheel inclining toward those on the other in the direction of the rim $c$. The rim is divided at $c^1$ the rim parts being provided at suitable intervals around the wheel with brackets $d$ adapted to receive the thrust of right and left threaded bolts $e$ operated by corresponding nuts $f$. The tire $a$ with the metal base band $b$ is the ordinary band tire of commerce, the parts being so constructed that when the division $c^1$ is closed or nearly closed, the band $b$ may be slipped over the rim $c$. If now the spokes are "spread" by means of the nuts $f$, the radial "throw" of the outer ends of the spokes will be increased with the result that the rim parts $c$ are caused to grip tightly the inside of the band $b$.

Referring to Fig. 2, the rim parts are provided with spaced brackets $h—h^1$, those ($h$) on one, preferably the outer side of the wheel being tapped to receive thrust bolts $g$ adapted to bear against the opposite brackets $h^1$ whereby the necessary separation of the spokes is effected.

Referring to Figs. 3 and $3^a$, the rim parts $c$ are provided with spaced brackets $k$ having taper recesses to receive correspondingly tapered bolts $i$ operated by nuts $i^1$ to effect the necessary separation of the spokes.

Referring to Fig. 4, the spokes $s$ are of the "crossed" type, that is to say, the spokes connected to one side of the rim are connected to the opposite side of the hub. In such cases, expansion of the rim elements— due to the increased radial "throw" of the spokes—is effected by drawing together the outer ends of the spokes. A suitable and simple method of effecting this operation comprises bolts $m$ passed loosely through brackets $n$ on one side of the wheel, and screwing into brackets $n^1$ on the opposite side of the wheel.

Referring to Fig. 5, in this modification a split ring $p$ of wedge section bears against taper surfaces $o^1$ on rings $o$ (or brackets) carried by the rim parts $c$. Suitable screw, toggle, or equivalent mechanical devices may be employed to expand the ring $p$ whereby the necessary separation of the spokes is effected.

Figure 7:
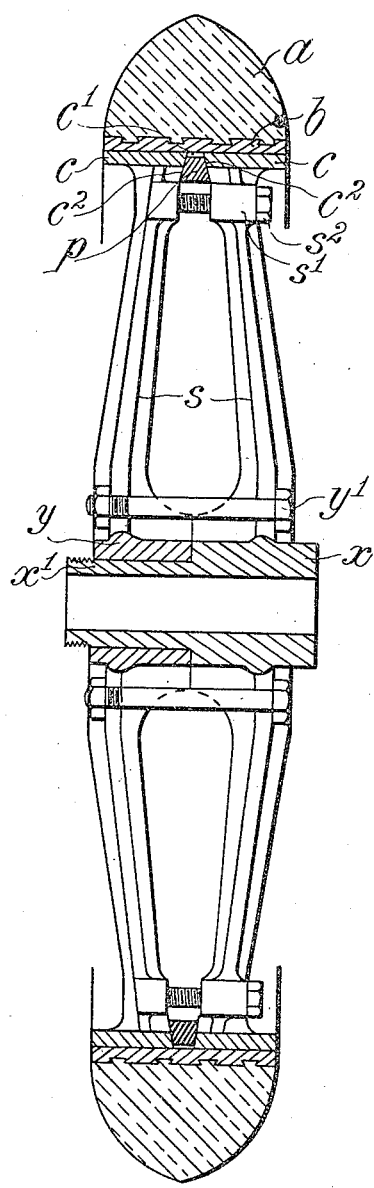
Figure 8:
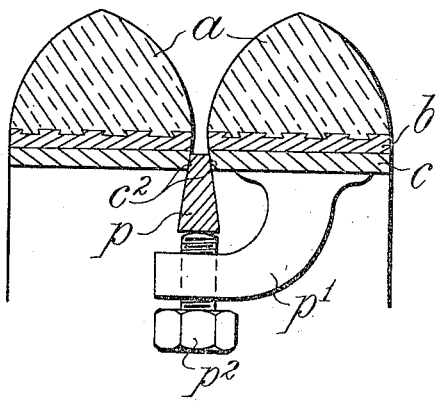
Figure 9:
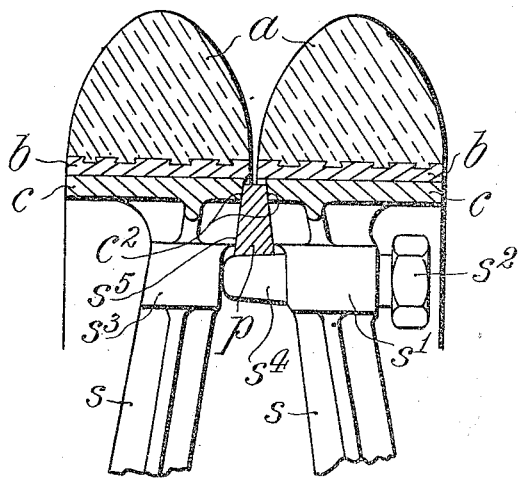

Referring to Figs. 6 to 9, a series of wedged segments $p$ engage taper surfaces $c^2$ on the rim parts $c$ and taper shoulders $s^5$ on the outer ends of the spokes. The segments are forced outward by means of bolts or set-screws $p^2$ screwing into brackets $p^1$ carried by one of the rim parts as clearly shown in Figs. 6 and 8. Figs. 6, 7 and 9 show also a means of separating the spokes consisting of bolts $s^2$ screwing into bosses $s^1$ formed on one set of spokes and bearing against suitably formed bosses $s^3$ on the opposite spokes. As shown in Fig. 9 the bolts $s^2$ may be formed with taper ends $s^4$ adapted to bear under the ends of the wedge segments $p$ to assist in forcing the latter outward.

If desired I may embody a divided hub in a wheel constructed in accordance with my invention, for example in the manner shown in Fig. 7 wherein the wheel is divided at the hub in addition to the division $c^1$ at the rim. One set of spokes is carried on the hub part $x$ which has a reduced part $x^1$ on which is adapted to slide the hub part $y$ carrying the other set of spokes. By drawing together the hub parts by means of the bolts $y^1$ the outward expansion of the spoke and rim elements may be assisted or augmented.

Obviously other devices may be employed at the hub in the cases where this is divided, such, for example, as are described above in connection with the rim or outer ends of the spokes.

The brackets, lugs, or the like, may be formed integral with the rim, spokes, or hub, or may be secured thereto by welding, brazing, riveting, or in other convenient manner.

In designing the wheels, I preferably arrange that the strain in the spokes is set up during or to facilitate assemblage of the tire or tires so that the wheel parts assume to a great or less degree their normal condition when the tire is finally gripped.

What I claim and desire to secure by Letters Patent of the United States is:—

1. A metal rim comprising a hub, a removable rim, a divided rim, spokes carried by the said hub and portions of the divided rim and so arranged as to normally hold the divided portions of the rim together, and means for moving portions of said divided rim outwardly from the hub and in contact with the removable rim and moving said divided rim portions away from each other.

2. A metal wheel comprising a hub, a rim composed of a plurality of sections, spokes carried by the hub and the sections of the rim and so arranged as to normally hold the said sections of the rim together, and means for moving portions of the sections of the rim outwardly from the hub and away from each other for the purpose described.

3. A metal wheel comprising a hub, a circumferentially divided rim, spokes carried by the hub and the divided sections of the rim, the said spokes so arranged as to normally hold the said sections of the rim together, and means for moving portions of the said sections of the rim outwardly from the hub and away from each other for the purpose described.

4. A metal wheel comprising a hub, a circumferentially divided rim, spokes carried by the hub and the divided sections of the rim, the said spokes so arranged as to normally hold the said sections of the rim together, and adjustable means for moving portions of and for holding the said sections of the rim outwardly from the hub and away from each other for the purpose described.

5. A metal wheel comprising a hub, a circumferentially divided rim, spokes carried by the hub and sections of the rim, the said spokes inclined inwardly whereby the sections of the rim are normally held together, and means for moving portions of and for holding the said sections of the rim outwardly from the hub and away from each other for the purpose described.

6. A metal wheel comprising a hub, a circumferentially divided rim, and two sets of oppositely inclined spokes connecting the said hub to the said divided rim, and means for positively effecting transverse or axial adjustment of portions of the said rim parts and moving said parts outwardly from said hub for the purpose described.

7. A metal wheel comprising a hub, a circumferentially divided rim, two sets of oppositely inclined spokes each connecting the said hub to one part of the divided rim and normally holding the said rim parts together, a tire carrying rim mounted over the said divided rim, and means for positively effecting transverse or axial adjustment of the said rim parts for the purpose described.

8. In a metal vehicle wheel, the combination with a hub, a circumferentially divided rim, and two sets of oppositely inclined spokes connecting the said hub to the said divided rim, of means for positively effecting transverse or axial adjustment of said rim parts and moving portions of said parts outwardly from said hub, said means comprising opposing brackets on the parts of the divided rim and thrust bolts engaging said brackets for the purpose described.

9. In a metal vehicle wheel, the combination with a hub, a circumferentially divided rim, and two sets of oppositely inclined spokes connecting the said hub to the said divided rim, of means for positively effecting transverse or axial adjustment of said rim parts and moving portions of said parts outwardly from said hub, said means comprising opposing brackets on the parts of the divided rim and tightening bolts engaging said brackets for the purpose described.

In testimony whereof I have hereunto signed this specification in the presence of two subscribing witnesses.

STANLEY RAMSBOTHAM.

Witnesses:
J. S. WITHERS,
FRANK BLAKEY.